Aug. 15, 1933.  G. E. GAUS  1,922,799
METHOD FOR AFFIXING IDENTIFICATION TAGS
Filed Dec. 16, 1932
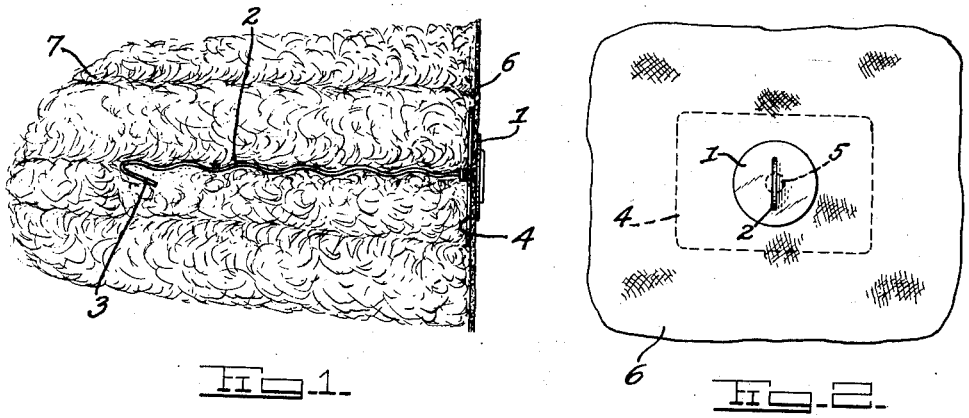
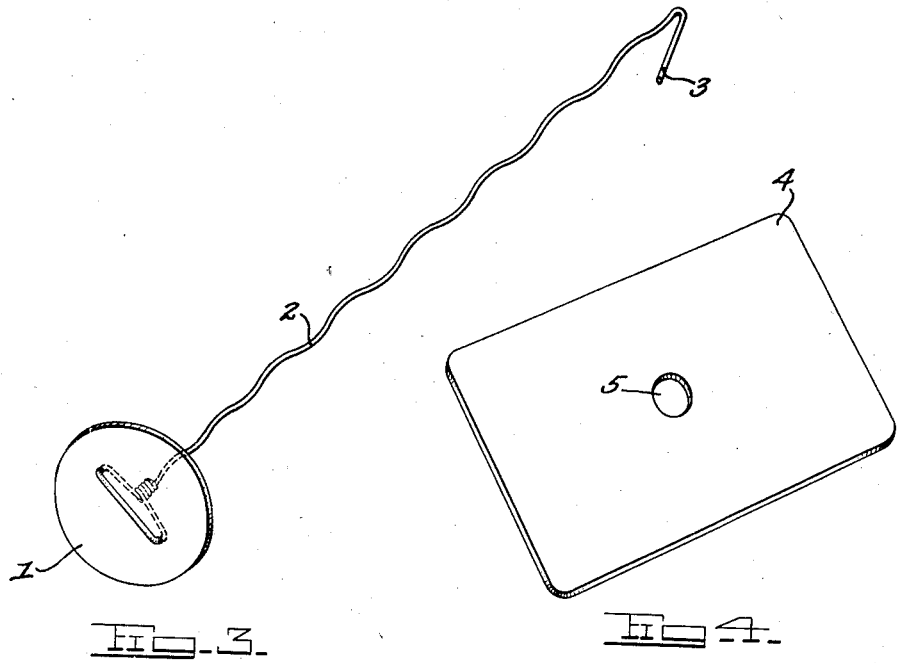
INVENTOR
George E. Gaus
By: [signature]
   Attorney Patented Aug. 15, 1933

1,922,799

UNITED STATES PATENT OFFICE 1,922,799

METHOD FOR AFFIXING IDENTIFICATION TAGS

George E. Gaus, Washington, D. C., dedicated to the free use of the Government and the people of the United States Application December 16, 1932
Serial No. 647,601

1 Claim. (Cl. 40—22)

(Granted under the Act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate this invention to the free use of the Government and the people of the United States.

My invention relates to affixing identification tags to bales of fibrous materials, particularly cotton, whereby the particular bales to which the tags have been applied may be identified in event the customary means of identification are effaced, destroyed, or changed; and has for its object to provide a simple method for inserting within the bale during the process of baling a durable identification tag, arranged in such a manner that it cannot readily be removed or replaced after the material has been baled.

In order to carry out the purposes of my invention, reference is to be had to the peculiar combination and arrangement of parts as shown in the accompanying drawing forming a part of this specification, in which simliar numerals refer to similar parts throughout the several views.

Figure I is a cross-section of an area of a bale of fibrous material illustrating the identification tag assembly and internal lock-plate in position.

Figure II illustrates an area of the covered outer surface of the completed bale with the identification tag or marker superimposed upon the bale covering, and the position of the internal lock-plate beneath the bale covering indicated by dotted line.

Figure III is a perspective view of the component parts of the identification of tag or marker comprising a tag head and a shank provided with anchoring means.

Figure IV is a perspective view of internal lock-plate.

Tag head or plate 1, of suitable size and shape and durable material, visible on the outer surface of bale 6, is rigidly attached by any conventional means, to shank 2. Shank 2 may be of a suitable metallic or non-metallic material, and either corrugated, spiral, fluted, barbed, or any other shape, which will resist withdrawal from fibrous bale material 7. Anchor device 3, may consist of a barb, disc, button, knot, or any other form, which will increase resistance to withdrawal of shank 2 from fibrous bale material 7. Internal lock-plate 4 (Figure IV), of suitable size, shape, and material admits anchoring assembly 2—3, through the aperture 5.

For purposes of explanation of method of application and operation of my device, the corrugated wire with barbed end, as illustrated in Figure III, will be described.

My invention may be practiced at the inception of the process of baling by placing tag head 1, outer face downward and resting on the pressing surface of the platen, or pressing member, of a conventional type of baling press. This places anchoring assembly 2—3 in an upright position. The bale covering material, consisting, for example, of jute, burlap, or cotton bagging, etc., is forced downwardly on anchor assembly 2—3, coming to rest upon the inner surface of the tag head 1. Internal lock-plate 4, by means of aperture 5, is then forced over anchor barb 3, and slid down shank 2, lodging upon the inside area of the bale covering material. Having the identification means 1—2—3, in position as herein described, fibrous material 7 is introduced into the press-box, and the process of baling is performed in the conventional manner. The customary process of baling effects the envelopment and impaction of anchoring assembly 2—3 with fibrous material 7, thereby arresting its removal. It also secures retention of the bale covering between tag head 1 and internal lock-plate 4. Upon completion of baling tag head 1 appears on the outer surface of that portion of the bale covering material, which is superimposed upon internal lock-plate 4.

While the foregoing is a preferred embodiment of the means for practicing my invention, I do not wish to be restricted thereto.

Having thus described my invention, I claim as new and desired to secure by Letters Patent:

A method for affixing identification tags to fibrous material, which comprises initially securing an identification tag, having anchoring means, to a bale covering, and impacting the anchoring means with the fibrous material during the process of baling.

GEORGE E. GAUS.